United States Patent
Ronda et al.

(10) Patent No.: US 8,373,130 B2
(45) Date of Patent: Feb. 12, 2013

(54) PROTECTION OF HYGROSCOPIC SCINTILLATORS

(75) Inventors: Cornelis R. Ronda, Aachen (DE); Guenter Zeitler, Aachen (DE); Herbert Schreinemacher, Baesweiler (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 332 days.

(21) Appl. No.: 12/741,212

(22) PCT Filed: Oct. 29, 2008

(86) PCT No.: PCT/IB2008/054492
§ 371 (c)(1),
(2), (4) Date: May 4, 2010

(87) PCT Pub. No.: WO2009/060349
PCT Pub. Date: May 14, 2009

(65) Prior Publication Data
US 2010/0276600 A1 Nov. 4, 2010

Related U.S. Application Data

(60) Provisional application No. 60/986,785, filed on Nov. 9, 2007.

(51) Int. Cl.
*G01T 1/20* (2006.01)
(52) U.S. Cl. .............. 250/362; 250/367; 250/484.2
(58) Field of Classification Search .......... 250/362, 250/366, 367, 368, 370.11, 484.2; 427/123
See application file for complete search history.

(56) References Cited

U.S. PATENT DOCUMENTS

| | | | |
|---|---|---|---|
| 5,132,539 A | 7/1992 | Kwasnick et al. | |
| 5,614,721 A * | 3/1997 | Pandelisev | 250/368 |
| 6,149,748 A | 11/2000 | Boedinger et al. | |
| 6,594,916 B2 | 7/2003 | Boroson et al. | |
| 6,657,201 B2 | 12/2003 | DeJule | |
| 7,126,130 B2 | 10/2006 | Hennessy et al. | |
| 7,265,371 B2 | 9/2007 | Shoji et al. | |
| 2003/0127600 A1 | 7/2003 | Vafi et al. | |
| 2003/0173493 A1* | 9/2003 | Homme et al. | 250/200 |
| 2006/0104880 A1 | 5/2006 | Iltis | |
| 2007/0007460 A1 | 1/2007 | Hochstetler et al. | |
| 2007/0040125 A1 | 2/2007 | Sato et al. | |

FOREIGN PATENT DOCUMENTS

| | | |
|---|---|---|
| JP | 05060871 A | 3/1993 |
| WO | 2007046010 A2 | 4/2007 |

OTHER PUBLICATIONS

Epoxy Technology, Inc., EPO-TEK 301-2 Technical Data Sheet, Nov. 2005, 1 page, rev. VIII, www.EPOTEK.com.
Kramer, et al., Development and characterization of highly efficient new cerium doped rare earth halide scintillator materials, Journal of Materials Chemistry, 2006, pp. 2773-2780, vol. 16, abstract attached.
Shah, et al., LaCl3:Ce Scintillator for Gamma Ray Detection, Nuclear Instruments and Methods, May 25, 2002, 7 sheets.

* cited by examiner

*Primary Examiner* — David Porta
*Assistant Examiner* — Faye Boosalis

(57) ABSTRACT

A radiation detector (100) includes an array of scintillator pixels (102) in optical communication with a photosensor. The scintillator pixels (102) include a hygroscopic scintillator (104) and one or more hermetic covers (106a, 106b). A desiccant (124) may be disposed between a hermetic cover (106a) and the scintillator (104) or between the hermetic covers (106a, 106b).

21 Claims, 3 Drawing Sheets

PROTECTION OF HYGROSCOPIC SCINTILLATORS

CROSS REFERENCE TO RELATED APPLICATIONS

This application claims the benefit of U.S. provisional application Ser. No. 60/986,785 filed Nov. 9, 2007, which is incorporated herein by reference.

The present application relates to the protection of moisture sensitive scintillators.

Various applications in fields such as high energy physics, medical imaging, non-destructive testing and other industrial applications, threat detection, oil well logging and other geological exploration applications rely on the ability to detect radiation such as energetic photons (e.g., x-rays and gamma rays) and particle radiation (e.g., neutrons). Systems in these and other fields have employed radiation detectors to detect the radiation of interest, with suitable signal processing circuitry being used to process the detector signals to suit the requirements of the application.

In medical imaging applications such as positron emission tomography (PET) and single photon emission tomography (SPECT), for example, signals from a number of such detectors are processed to produce images indicative of the distribution of a radiopharmaceutical in a patient. These images can play a significant role in the diagnosis and treatment of diseases such as cancer and heart disease.

The detectors in these and other systems have employed a scintillator that produces scintillation photons in response to received radiation. A photosensor in optical communication with the scintillator receives the scintillation photons and produces a corresponding output signal for processing.

The scintillator can play an important role in the performance of the detector and hence the overall performance of the system. Although the precise requirements are generally application-specific, the ideal scintillator would in general have a high stopping power, produce a high light output, possess fast response and decay times, and be mechanically and environmentally robust.

One class of scintillators that has garnered significant attention is that of rare-earth halide scintillators of the general formula $LnX_3$, where Ln represents a rare earth ion and X is selected from the group of chlorine (Cl), bromine (Br), and iodine (I). Unfortunately, however, these materials are sensitive to moisture, exposure to which can negatively affect scintillator performance.

Because the production and/or structuring the scintillator can generally be performed in an inert atmosphere, the hygroscopic nature of these materials is ordinarily not a significant drawback during the manufacturing process. In transport and use, however, the scintillators and the systems in which they are used must often be placed in moisture-laden environments. Unless suitably protected, performance of the scintillator and hence the system in which it is used may be suboptimal.

Aspects of the present application address these matters and others.

In accordance with one aspect, an apparatus includes a scintillator and a cover. The cover is disposed on a surface of the scintillator and hermetically seals the scintillator. The cover includes a metal layer.

In accordance with another aspect, in a radiation detector including first and second scintillator pixels in optical communication with a photosensor, a method includes using a first cover including a first metal layer to hermetically seal the first scintillator pixel and using a second cover including second metal layer to hermetically seal the second scintillator pixel.

In accordance with another aspect, a method includes applying a first optically opaque hermetic cover to a first hygroscopic scintillator to form a first scintillator assembly and applying a second optically opaque hermetic cover to form a second scintillator assembly.

According to another aspect, a radiation detector includes a pixellated scintillator, a cover disposed on and that hermetically seals at least a first pixel of the pixellated scintillator, wherein the cover includes a metal layer, and a photosensor in optical communication with the first pixel.

Still further aspects of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention. Those of ordinary skill in the art that, for ease of illustration, the present drawings are not necessarily to scale.

FIG. 1 is a top view of a radiation detector.

FIGS. 2A, 2B, and 2C depict cross sectional views along the line 2-2 of FIG. 1.

Figure 1:
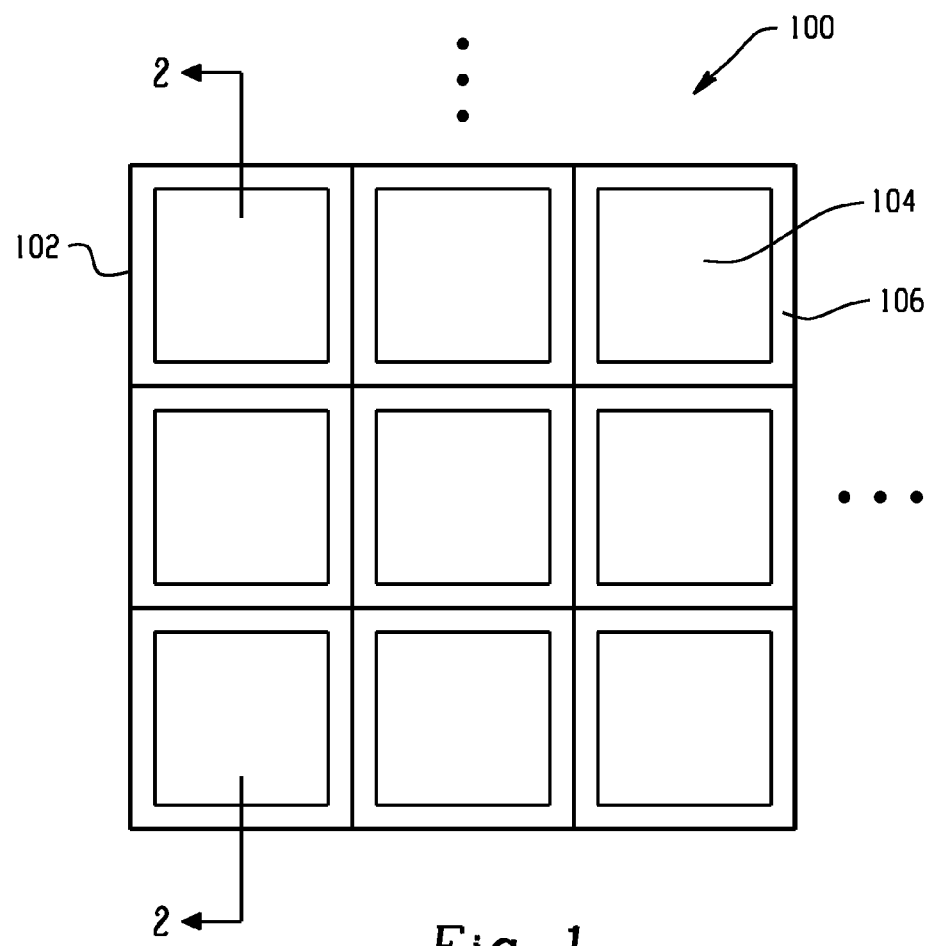

With reference to FIG. 1, a radiation sensitive detector 100 includes a plurality of scintillator pixels 102 arranged in a two-dimensional array. The various scintillator pixels 102 include a scintillator 104 and a cover 106 that is disposed on a surface of and hermetically seals the scintillator 104.

The scintillator 104 includes a hygroscopic or moisture sensitive scintillator material such as a (suitably doped) rare earth halide having the general formula $LnX_3$, where Ln represents a rare earth ion and X is selected from the group of chlorine (Cl), bromine (Br), and iodine (I). Other hygroscopic scintillator materials are also contemplated, however, and may be selected based on application-specific requirements. The various scintillators 104 take the form of a six (6) sided rectangular prism each having a volume on the order of about 0.5 to 1.0 cubic centimeters ($cm^3$), although other shapes and sizes are contemplated.

Though illustrated as a two dimensional, regular array, the various scintillator pixels 102 may be configured an irregular array, (e.g., with scintillators 104 having different sizes or with adjacent rows and/or columns offset by a fraction of the pixel 102 pitch), as a one-dimensional array, including only a single scintillator pixel 102, or the like.

Figure 2A:
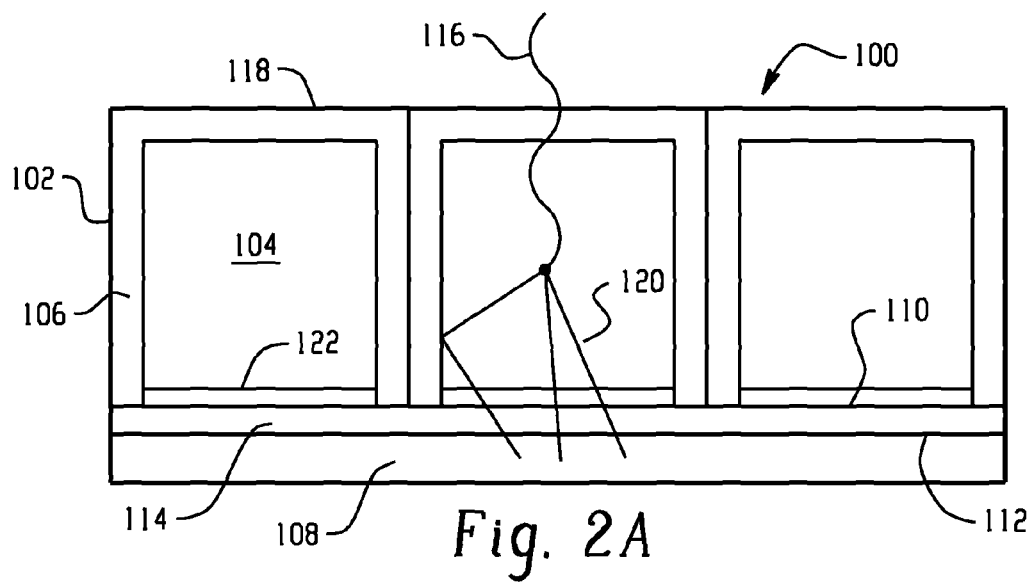

FIG. 2A depicts a first cross-sectional view of the detector 100. As illustrated, the detector 100 includes a photosensor 108 such as one or more photomultiplier tubes (PMTs), photodiodes, silicon photomultipliers (SiPMs), charge coupled devices (CCDs), complementary metal oxide semiconductor (CMOS) photosensors, or the like in optical communication with the various scintillator pixels 102. A layer of light transmissive adhesive 114 such as an optical epoxy couples the bottom or light emitting faces 110 of the scintillator pixels 102 and the top or light receiving face 112 of the photosensor 108.

Thus, gamma or other radiation 116 received at the top or radiation receiving face 118 of the detector 100 interacts with the scintillator 104 to produce scintillation photons 120 that are received by the photosensor 108. Where the side or top face(s) of the scintillator pixels 102 are optically reflective, scintillation photons 120 may be reflected at the respective face(s). Where, on the other hand, the face or faces are optically absorbent, photons 120 may be absorbed at the respective face(s).

In the illustrated embodiment, the hermetic cover 106 includes a metal layer that hermetically seals the various scintillator pixels 102 on five (5) of their six (6) faces. A light transmissive window 122 formed from a relatively moisture-impervious material such as a polymer, a light transmissive adhesive, glass, quartz, or the like protects the light emitting face 110. A particular advantage of the illustrated arrangement is that the scintillator pixel 102 is substantially sealed, thereby tending to reduce the environmental constraints imposed on the remainder of the manufacturing process. Alternatively, the window 122 may be omitted, in which case hermetic sealing of the light emitting face 110 is performed by the light transmissive adhesive 114.

In one embodiment, the cover 106 includes a moisture impervious wrapper that is wrapped around each of the various scintillators 104 on substantially five (5) sides. The wrapper may include a flexible polymer substrate having a thin metal layer deposited thereon. One suitable material for the wrapper is a thin polyester film coated on one or both sides with a layer of aluminum, which material is sometimes referred to as aluminized Mylar™. The wrapper may also be formed from a thin metal foil. A layer of adhesive adheres the wrapper to the surface of the scintillator 104, particularly in the vicinity of those edges that may be exposed to moisture.

The wrapper may also extend to cover the sixth face 110 of the scintillator 104. Note that, in order to provide for light transmission between the scintillator 104 and the photosensor 108, the metal layer should be omitted from that portion of the substrate that covers the light transmissive face 110. Again, such an arrangement tends to reduce the environmental constraints imposed on the manufacturing process.

In another embodiment, the cover 106 includes a thin metal layer that is applied to the surface(s) of the scintillator 104 by evaporation or precipitation, with the metal layer again being omitted from the light emitting face 110. Application of the metal layer via evaporation is particularly attractive in the case of metals such as aluminum or zinc that can be evaporated relatively easily. Application by way of precipitation may be performed using metals such as tungsten or nickel that can be obtained in the form of metal carbonyls (e.g., $W(CO)_6$ or $Ni(CO)_4$). These molecules precipitate on the scintillator surface and decompose, leaving behind a thin metal layer. The process can be accelerated by exposing the scintillator to an elevated temperature, for example in the vicinity of about 400 Kelvin (K).

In another embodiment, the cover 106 includes a chemical passivation layer. Such an implementation leverages the fact that rare earth halides react at elevated temperature with a mixture of water vapor and carbon dioxide to form chemically inert rare earth oxycarbonates (e.g., of the form $(LnO)_2 CO_3$ where Ln is the rare earth metal). The resultant chemical passivation layer may be used to hermetically seal the desired surface(s) of the scintillator.

In a yet even other embodiment, the rare earth halides are treated carefully with bidentate organic acids such as tartartic acid, e.g. dissolved in water. The rare earth halides react with this solution, to form water insoluble rare earth tartrates. The same procedure may be used with other acids, forming other water insoluble rare earth salts, like boric acid.

As the above materials are ordinarily optically opaque, such an arrangement also tends to reduce undesirable optical cross-talk between the various pixels 102 when installed in an array. Where the metal layer is optically reflective, the metal layer may also tend to improve the detector optical efficiency.

Note that a scattering layer formed from a material such as a titanium dioxide ($TiO_2$) may also be applied to the various faces of the scintillator 104 prior to application of the covering 106. Again, the scattering layer would ordinarily be omitted from the light emitting face 110.

Figure 2B:
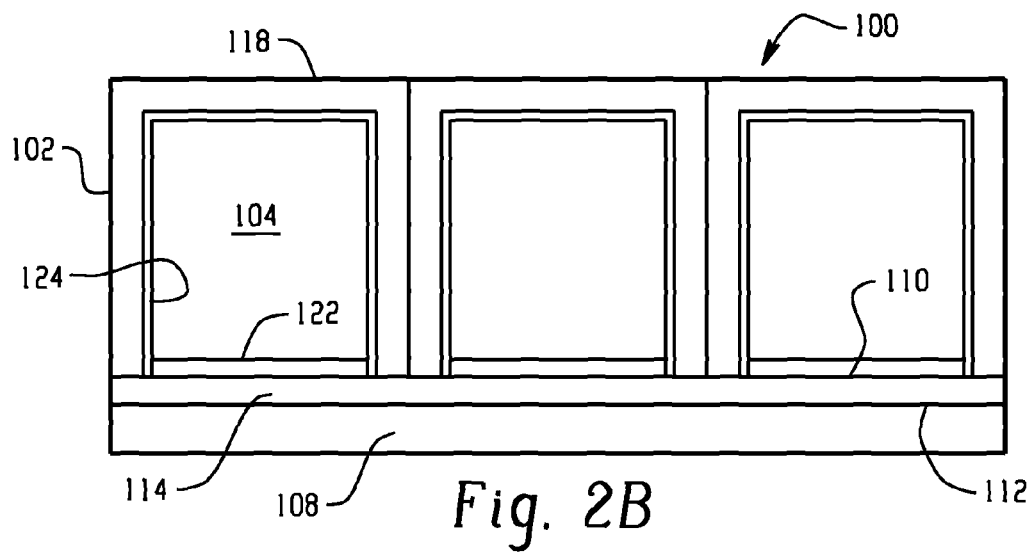

Notwithstanding the hermetic sealing provided by the covers 106, it is possible that moisture may, over time, diffuse through or otherwise find its way inside the covers 106. Thus, and as illustrated in FIG. 2B, a desiccant 124 may be placed between the cover 106 and the scintillator 104 as an aid to maintaining a state of dryness within the cover 106. Such an arrangement is particularly beneficial in which the cover 106 is formed using a wrapper as described above. Suitable desiccants 124 include calcium oxide (CaO), phosphorus pentoxide ($P_2O_5$), calcium chloride ($CaCl_2$), and molecular sieves formed from materials such as zeolites.

Figure 2C:
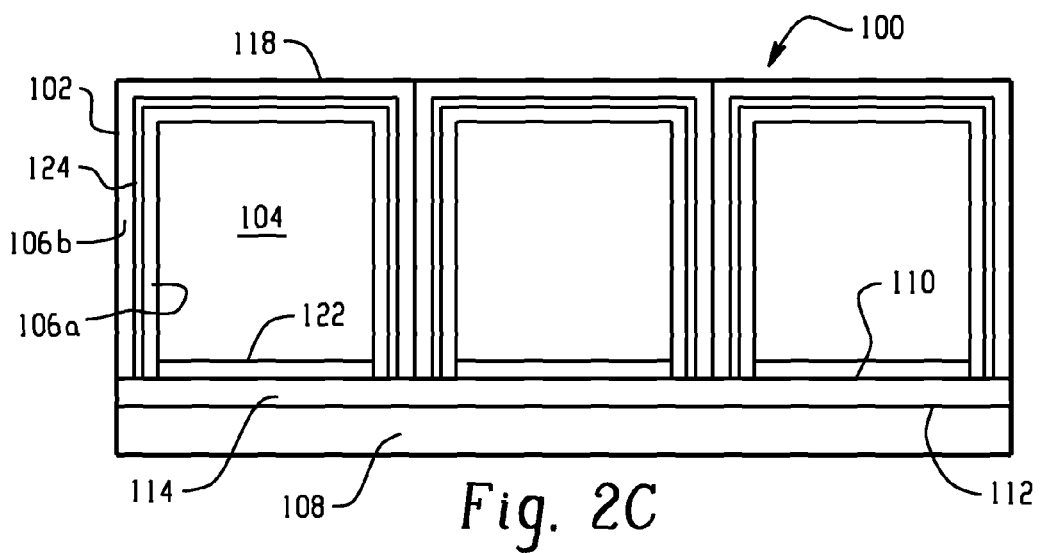

Another alternative is presented in FIG. 2C. As illustrated, the cover 106 includes a first, inner cover 106a and a second, outer cover 106b, with the desiccant 124 located therebetween. Again, such an arrangement is particularly suitable for implementations in which the cover layers 106a, 106b are formed from wrappers as described above. Alternately or additionally, the desiccant 124 may be located between the inner layer 106a and the scintillator 104.

Note also that the scintillators pixels 102 need not be individually covered or wrapped. Thus, for example, a given cover 106 may be used to seal multiple scintillator pixels 102.

Figure 3:
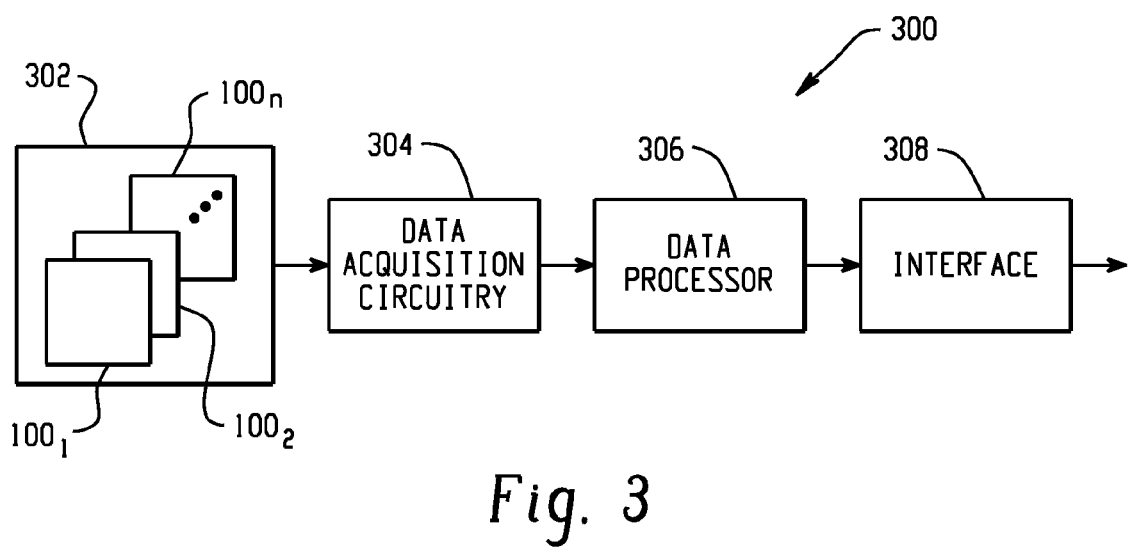
FIG. 3 depicts a radiation detection apparatus.

Turning now to FIG. 3, a radiation detection apparatus 300 employs one or more detectors $100_{1, 2, \ldots, n}$. As illustrated, the detectors 100 are assembled to form a detector assembly 302, which may likewise form a sub-assembly of a larger system. In the case of a positron emission tomography (PET) system, for example, one or more detector assemblies 302 are typically arranged about an examination region in a generally circular or other ring-shaped arrangement so that the radiations sensitive faces face generally inwardly toward the examination region.

Data acquisition circuitry 304 such as one or more signal conditioners, amplifiers, timers, analog to digital converters, and the like condition and otherwise acquire the signals produced by the detectors 100. As will be appreciated, the nature and function of the data acquisition circuitry 304 is ordinarily apparatus 300 dependent. Again to the example of a PET system, the data acquisition circuitry 304 may include coincidence detection, time of flight measurement, energy measurement, and related circuitry.

The data processor 306, the nature and function of which is likewise apparatus dependent 300, further processes the acquired data. Again to the example of a PET system, the data processor 306 may include a reconstructor that reconstructs the acquired data to produce volume or image-space data indicative of the spatial distribution or radionuclide decays in an object under examination.

An interface 308 provides an interface between the data processor 306 and a human user, a system or network, or the like. Again to the example of a PET system, the interface 308 may present the image space data in a human perceptible form or for storage in a suitable computer readable storage medium.

Figure 4:
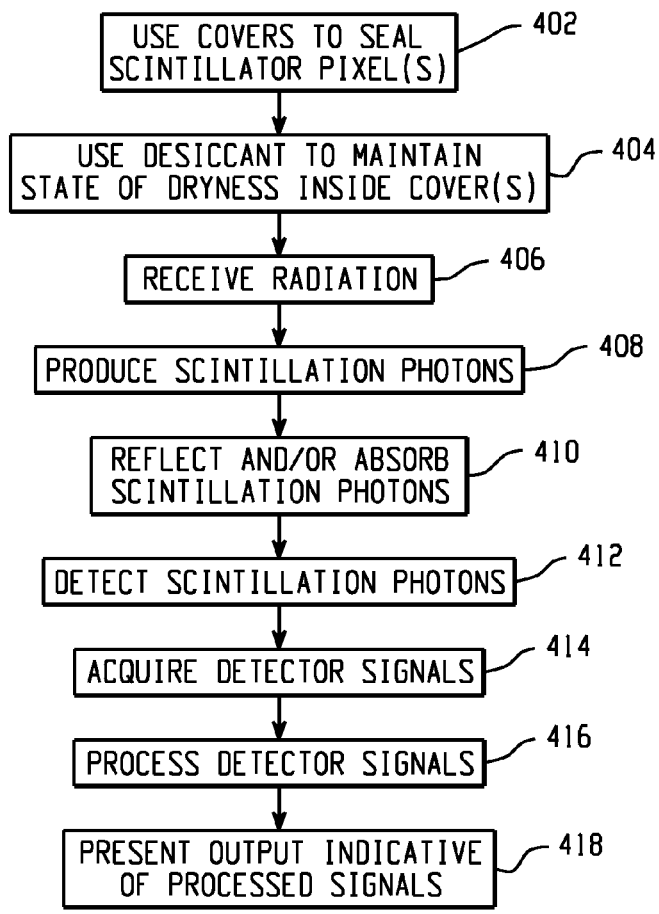
FIG. 4 depicts a method.

Operation will now be described with reference to FIG. 4.

At 402, the cover(s) 106 are used to hermetically seal the scintillators 104 of the various scintillator pixels 102. Thus, for example, a first cover including a first metal layer hermetically seals some or all of the surfaces of a first scintillator, and a second cover including a second metal layer hermetically seals some or all of the surfaces of a second scintillator.

At 404, the desiccant 124 may be used to maintain a state of dryness inside the covers 106.

At 406, radiation 116 is received at the radiation receiving face of the 118 of the detector 100.

At 408, the received radiation 116 interacts with a scintillator 104, producing scintillation photons 120.

At 410, and depending on the optical characteristics of the cover 106, scintillation photons 120 may be reflected and/or absorbed by the metal layer.

At 412, the scintillation photons 120 are detected by the photosensor 108, which generates corresponding output signals.

At 414, the output signals are acquired by the data acquisition circuitry 304.

At 416, the acquired data is processed by the data processor 306.

At 418, an output indicative of the processed data is presented via the interface 308.

Figure 5:
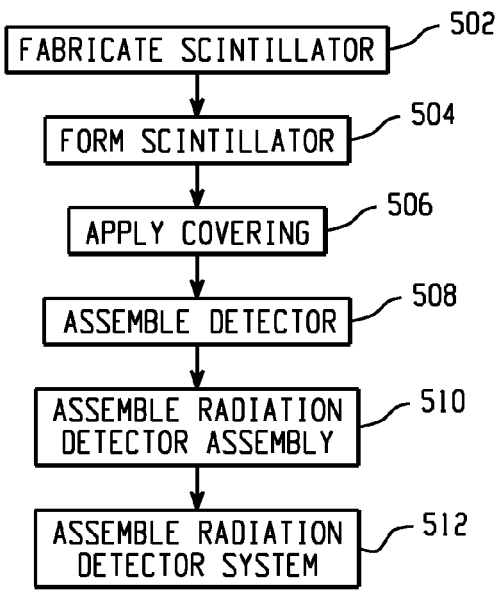
FIG. 5 depicts a method.

Fabrication will now be described with reference to FIG. 5.

A suitable scintillator material is fabricated at 502 using known techniques, for example by way of crystal growth or sintering process. In one embodiment, the scintillator material includes a rare earth halide.

At 504, the scintillator material is processed, for example to form scintillators 104 for use in a pixelated scintillator array. In one implementation, and as noted above, the scintillators have a volume between about 0.5 and 1.0 cm$^3$.

At 506, the hermetic cover 106 is applied to the scintillators 104. Where the covering 106 includes a wrapper, for example, the various scintillators 104 may be individually wrapped. Alternatively, the cover 106 may be applied to various pixels via an evaporative, precipitation, passivation or other suitable technique. Again depending on the particular implementation, an optical window 122 may also be applied.

At 508, the scintillator pixel(s) 102 and suitable photosensor(s) 108 are assembled to form the radiation detector 100.

At 510, one or more radiation detectors 100 are assembled in a detector assembly 302.

At 512, one or more detector assemblies 302 are assembled in a radiation detector system 300.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus comprising:
a first scintillator;
a first cover disposed on a surface of the first scintillator and that hermetically seals the first scintillator, wherein the first cover includes a metal layer; and
a second cover that covers the first cover, wherein a desiccant is disposed between the first cover and the second cover, and the second cover hermetically seals the desiccant.

2. The apparatus of claim 1 wherein the first cover includes a wrapper that covers at least a portion of the first scintillator, wherein the metal layer forms at least a part of the wrapper.

3. The apparatus of claim 2 wherein the wrapper includes a flexible, metalized polymer.

4. The apparatus of claim 1 wherein the metal layer is formed on the surface of the first scintillator by way of evaporation or precipitation.

5. The apparatus of claim 1 wherein the metal layer includes a passivation layer formed on a surface of the first scintillator.

6. The apparatus of claim 1 wherein the first scintillator includes a rare earth metal and the metal layer includes one of a rare earth oxycarbonate, a rare earth salt, or a rare earth tartrate.

7. The apparatus of claim 1 including a light transmissive window, wherein the first scintillator, the cover, and the light sensitive window form a first scintillator pixel for use in a radiation detector that includes a second scintillator pixel and a photosensor, wherein the first scintillator pixel includes a first side that faces the second scintillator pixel and a second side that faces the photosensor, wherein the metal layer covers at least a portion of the first side and the light transmissive window covers at least a portion of the second side; whereby, when the first and second scintillator pixels are installed in the radiation detector, scintillation photons produced by the scintillator pass through the light transmissive window for detection by the photosensor and are prevented from reaching the second scintillator pixel by the metal layer.

8. The apparatus of claim 1 including a plurality of scintillators, a plurality of covers, and a photosensor in optical communication with a scintillator, wherein each cover is disposed on and hermetically seals a corresponding one of the plurality of the scintillators.

9. The apparatus of claim 1 wherein the scintillator and the cover form a part of an imaging apparatus.

10. In a radiation detector including first and second scintillator pixels in optical communication with a photosensor, a method comprising:
using a first cover including a first metal layer to hermetically seal the first scintillator pixel, wherein a first desiccant is disposed between the first cover and a second cover, wherein the second cover hermetically seals the first desiccant; and
using a third cover including a second metal layer to hermetically seal the second scintillator pixel, wherein a second desiccant is disposed between the third cover and a fourth cover, wherein the fourth cover hermetically seals the second desiccant.

11. The method of claim 10 wherein the first metal layer is disposed on a first polymer substrate that covers at least a portion of the first scintillator pixel and the second metal layer is disposed on a second polymer substrate that covers at least a portion of the second scintillator pixel.

12. The method of claim 10 wherein the first scintillator pixel includes a scintillator material and the first metal layer is formed on a surface of the scintillator material by evaporation, precipitation, or passivation.

13. The method of claim 10 including using the first metal layer to reflect scintillation photons produced by the first scintillator pixel.

14. The method of claim 10 wherein the detector includes a third scintillator pixel and the method includes using the first cover to hermetically seal the third scintillator pixel.

15. A method comprising:
applying a first optically opaque hermetic cover to a first hygroscopic scintillator to form a first scintillator assembly, wherein a first desiccant is disposed between the first cover and a second optically opaque hermetic cover, wherein the second cover hermetically seals the first desiccant;

applying a third optically opaque hermetic cover to a second hygroscopic scintillator to form a second scintillator assembly, wherein a second desiccant is disposed between the third cover and a fourth optically opaque hermetic cover, wherein the fourth cover hermetically seals the second desiccant.

16. The method of claim 15 where the first cover includes a wrapper and the method includes adhering the wrapper to the first scintillator.

17. The method of claim 16 wherein the first scintillator is a rectangular prism including six sides and the wrapper covers the six sides.

18. The method of claim 15 wherein the scintillator includes a rare earth and the first cover includes a rare earth oxycarbonate or a rare earth tartrate.

19. The method of claim 15 wherein applying the first cover includes precipitating a metal carbonyl.

20. The method of claim 15 including assembling the first scintillator assembly, the second scintillator assembly, and a photosensor in a radiation detector.

21. A radiation detector comprising:
a pixellated scintillator;
a first cover disposed on and that hermetically seals at least a first pixel of the pixellated scintillator, wherein the cover includes a metal layer; and
a second cover, wherein a desiccant is disposed between the first cover and the second cover, and the second cover hermetically seals the desiccant;
a photosensor in optical communication with the first pixel.

* * * * *